United States Patent

[11] 3,626,062

[72] Inventors John C. Babcock;
J. Allen Campbell, both of Kalamazoo, Mich.
[21] Appl. No. 666,490
[22] Filed Sept. 8, 1967
[45] Patented Dec. 7, 1971
[73] Assignee The Upjohn Company
Kalamazoo, Mich.
Continuation-in-part of application Ser. No. 114,621, June 5, 1961, now Patent No. 3,341,557, which is a continuation-in-part of application Ser. No. 69,557, Nov. 6, 1960, now abandoned. This application Sept. 8, 1967, Ser. No. 666,490

[54] COMPOSITION COMPRISING 7α-METHYL ESTRADIOL 3,17-BISTRIMETHYL SILYL ETHERS
5 Claims, No Drawings

[52] U.S. Cl. .................................................. 424/238, 260/397.5, 260/239.55, 195/51, 260/397.4
[51] Int. Cl. ............................................... C07c 169/08
[50] Field of Search ...................................... 260/397.5

[56] References Cited
UNITED STATES PATENTS
3,019,241  6/1962  Ercoli ........................... 260/397.4
3,189,528  6/1965  Smith et al. ................... 195/51
3,318,927  5/1967  Anner et al. ................... 260/397.5
FOREIGN PATENTS
742,211    9/1966  Canada ......................... 260/397.5

Primary Examiner—Elbert L. Roberts
Attorneys—Willard L. Cheesman and John Kekich ABSTRACT: This invention relates to novel steroid compounds and processes for their preparation; more particularly to those compounds embraced by the formula (II)

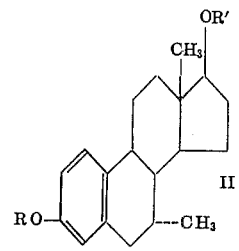

wherein R is selected from the group consisting of hydrogen the acyl radical of a hydrocarbon carboxylic acid containing from one through twelve carbon atoms, an alkyl radical containing from one through eight carbon atoms, tetrahydrofuranyl, tetrahydropyranyl, 5-substituted tetrahydropyranyl, and a silyl radical of the formula

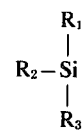

wherein $R_1$, $R_2$ and $R_3$ are selected from the group consisting of alkyl of one through six carbon atoms and phenyl and R' is selected from the group consisting of hydrogen, the acyl radical of a hydrocarbon carboxylic acid containing from one through twelve carbon atoms, and

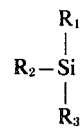

wherein $R_1$, $R_2$, $R_3$ have the same meaning as above.

COMPOSITION COMPRISING 7α-METHYL ESTRADIOL 3,17-BISTRIMETHYL SILYL ETHERS

CROSS REFERENCES TO RELATED APPLICATIONS

This application is a continuation-in-part of application Ser. No. 114,621, filed June 5, 1961, now Pat. No. 3,341,557 which is in turn a continuation-in-part of abandoned application Ser. No. 69,557, filed Nov. 6, 1960.

BRIEF SUMMARY OF THE INVENTION

7α-methylestradiol, embraced by formula II, above, can be prepared by several known methods described below.

1. By reduction of the 17-carbonyl group of 7α-methylestrone (I), e.g., with sodium borohydride at moderate (room) temperature, to yield 7α-methylestradiol (II),
2. By fermentation of 7α-methyl-19-nortestosterone with a micro-organism capable of introducing a double bond in the 1(2)—or 1(2)—and 4(5)—positions of the steroid nucleus, e.g., Corynebacterium simplex, to yield 7α-methylestradiol (II).
3. By dehydrogenating 7α-methyl-19-nortestosterone, e.g., by heating in the presence of a hydrogenation catalyst (e.g., palladium on charcoal) in a high boiling solvent such as p-cymene, to give 7α-methylestradiol (II).

The 3-ethers of 7α-methylestradiol of formula II, above, can be prepared by reducing the 3-ethers of 7α-methylestrone, e.g., 3-methyl ether of 7α-methylestrone (I), the 3-cyclopentyl ether of 7α-methylestrone (I), the 3-tetrahydropyranyl ether of 7-methylestrone (I), etc., in accordance with the procedure of (1), above, to yield the corresponding 3-ether of 7α-methylestradiol (II). The 3-acylates of formula II can likewise be prepared by the reduction of a 7α-methylestrone 3-acylate (I) by the procedure of (1), above, to yield the corresponding 7α-methylestradiol 3-acylate (II).

The 3-ethers of 7α-methylestradiol of formula II, above, can also be prepared by the known methods described below.

1. By treating 7α-methylestradiol (II) in accordance with the procedures disclosed in British Pat. No. 909,662, i.e., with an alkyl (or cycloalkyl) halide and an alkali metal alkylate, preferably at reflux temperature, to give a 3-alkyl (or cycloalkyl) ether of 7α-methylestradiol (II).
2. By treating 7α-methylestradiol (II) with an alkylating agent (e.g., a dialkylsulfate) in conventional manner, to give a 3-alkyl ether of 7α-methylestradiol (II).
3. By treating 7α-methylestradiol 17-acylate (II) with a cyclic enol ether (e.g., dihydrofuran, dihydropyran, 5-hydroxymethyldihydropyran, 5-carboxydihydropyran, etc.) at low temperature, preferably in the presence of an acidic catalyst (e.g., phosphorus oxychloride), to give the corresponding 3-ether (e.g., tetrahydrofuranyl, tetrahydropyranyl, 5-hydroxymethyltetrahydropyranyl, etc.) of 7α-methylestradiol 17-acylate (II).
4. By treating 7α-methylestradiol (II) with a diazoalkane (e.g., diazomethane, diazoethane, diazobutane, etc.) at ambient temperature in an inert solvent such as ether, ethylene glycol, dimethyl ether, etc., to give the corresponding 3-alkyl ether of 7α-methylestradiol (II).
5. By treating 7α-methylestradiol (II) or 7α-methylestradiol 17-acylate with a disilazane of the formula

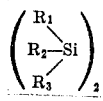

NH wherein $R_1$, $R_2$ and $R_3$ have the same meaning as above (e.g., hexamethyldisilazane, symmetrical diphenyltetramethyldisilazane, 1-methyl-1,1-dibutyl-3-phenyl-3,3-dimethyldisilazane, hexa-amyldisilazane, etc.) to yield a corresponding 3,17-bissilyl ether of 7α-methylestradiol (II) or a 3-silyl ether of 7α-methylestradiol 17-acylate (II).

The 3,17-diacylates of 7α-methylestradiol of formula II, above, can be prepared by conventional procedures, e.g., by treating 7α-methylestradiol (II) with the appropriate organic carboxylic acid anhydride (or chloride) at moderate temperatures for a period of 2 to 20 hours in the presence of an esterification catalyst such as pyridine, to yield the corresponding 7α-methylestradiol 3,17-diacylate (II).

The 3-monoacylates of 7α-methylestradiol (II) are obtained by treating 7α-methylestradiol with the appropriate carboxylic acid anhydride or chloride at low to moderate temperatures for a period of a few minutes to several hours in the presence of an esterification catalyst such as pyridine to yield the corresponding 7α-methylestradiol 3-acylate (II). Preferably the amount of carboxylic acid anhydride or chloride should be between about 1 and 3 equivalents of the amount of steroid employed.

The 17-monoacylates of 7α-methylestradiol (II) are obtained by mild alkaline hydrolysis of a 7α-methylestradiol 3,17-diacylate (II) using methods known in the art, e.g., hydrolysis with an alkali metal carbonate in aqueous alcohol at low to moderate temperatures, or by chromotography over basic alumina, e.g., grade II, to obtain the corresponding 7α-methylestradiol 17-acylate (II).

The 17-acylates of formula II, above, can be prepared by conventional procedures e.g., by treating the 3-alkyl (or cycloalkyl) ether of 7α-methylestradiol (II), the 3-tetrahydropyranyl ether of 7α-methylestradiol (II), the 3-tetrahydrofuranyl ether of 7α-methylestradiol (II), the 3-silyl ether of 7α-methylestradiol (II) and the 3-acylate of 7α-methylestradiol (II) with an acyl halide or anhydride in pyridine.

The 7α-methylestrone (I) starting material of (1), above, can be prepared by several known methods described below.

1. By fermentation of 7α-methyl-19-nortestosterone or 7α-methyl-19-nor-4-androstene-3,17-dione, with a micro-organism or its enzymes capable of introducing a double bond in the 1(2)— or 1(2)— and 4(5)—positions of the steroid nucleus, e.g., Cornyebacterium simplex or Septomyxa affinis to yield 7α-methylestrone (I).
2. By catalytically dehydrogenating 7α-methyl-19-nor-4-androstene-3,17-dione at the 1(2)-positions, e.g., by heating in the presence of a hydrogenation catalyst (e.g., palladium on charcoal) in a high boiling solvent e.g., p-cymene), to give 7α-methylestrone (I).
3. By treating 7α-methyl-19-nor-4-androstene-3,17-dione with a chemical dehydrogenating agent, e.g., a quinone such as 2,3-dichloro-5,6-dicyanobenzoquinone (DDQ) or 2,3,5,6-tetrachloro-1,4-benzoquinone (chloranil), or selenium compounds such as selenium dioxide or dibenzoyloxy selenium oxide, to yield 7α-methylestrone (I).
4. By pyrolysis of 7α-methyl-1,4-androstadiene-3,17-dione at elevated temperatures (e.g., between about 400° to 600° C.) its high boiling diluents (e.g., heavy mineral oil) to give 7α-methylestrone (I).
5. By treating 7α-methyl-1,4-androstadiene-3,17-dione in accordance with the procedures described in J. Amer. Chem. Soc. 86, 742, i.e., with lithium and diphenyl in the presence of diphenylmethane and employing tetrahydrofuran as solvent, to yield 7α-methylestrone (I).

The 3-ethers of 7α-methylestrone of formula I, above, can be prepared by the known methods described above for the preparation of the 3-ethers of 7α-methylestradiol (II) and 7α-methylestradiol 17-acylates (II) from 7α-methylestradiol (II) and 7α-methylestradiol 17-acylates (II).

The 3-acylates of 7α-methylestrone can be prepared by conventional procedures, e.g., by treating 7α-methylestrone (I) with the appropriate organic carboxylic acid anhydride (or chloride) at moderate temperatures in the presence of an esterification catalyst such as pyridine, to yield the corresponding 7α-methylestrone 3-acylate (I).

All of the compounds included within formulas I and II, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with suitable solvents, such as, Skellysolve B, methylene chloride-Skellysolve B, acetone-Skellysolve B, and the like.

The compounds of formula II of the present invention are potent estrogens when administered either orally or parenterally; when assayed in rats by the Allen-Doisy test 7α-methylestradiol was found to have approximately three times the activity of estradiol. In addition, the compounds of formula II, when combined with progestins such as 6α-methyl-17α-hydroxyprogesterone 17-acetate (Provera), 7α-methyl-17α-ethynyl-19-nortestosterone, 17α-hydroxy-6-methyl-16-methylene-4,6-pregnadiene-3,20-dione 17-acetate (Melengestrol acetate), 17-hydroxy-19-nor-17α-pregn-5(10)-en-20-yn-3-one (Norethynodrel), 19-nor-17α-pregn-4-en-20-yne-3 β,17-diol-diacetate (Ethynodiol diacetate), 17 hydroxy-19-nor-17α-pregn-4-en-20-yn-3-one (Norethindrone), the corresponding 17-acetate (Norethindrone acetate), 6α,21-dimethyl-17β-hydroxy-4-pregnen-20-yn-3one (Dimethisterone), 6-chloro-17α-hydroxy-4,6-pregnadiene-3,20-dione 17-acetate, etc., are useful for the prevention of ovulation in mammals. The foregoing properties make the new compounds useful in veterinary practice.

The compounds of the invention can be prepared and administered to mammals, birds and other animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

DETAILED DESCRIPTION

It is to be understood that the invention is not to be limited to the exact details of operation or exact compositions shown and described herein, as obvious modifications and equivalents will be apparent to one skilled in the art, and the invention is therefore to be limited only by the scope of the appended claims.

EXAMPLE 1

7α-methylestrone(7α-methyl-1,3,5(10)-estratrien-3ol-17-one) (I)

To 10 l. of sterile glucose-yeast extract medium there was added an inoculum of 500 ml. of *Corynebacterium simplex* ATCC 6946. The culture was stirred and aerated for about 48 hours at a temperature of about 28° C., lard oil being added to suppress the foam. After about 48 hours the pH was 6.1. To the fermentor, 1 g. of 7α-methyl-19-nortestosterone, prepared as in Steroids 1, 317, was added and aeration continued for about 24 hours. At this time the pH was 6.5. The beer was adjusted to pH 3 with hydrochloric acid and extracted four times with 3 l. of methylene chloride. Paper chromatography of an aliquot of the solvent extract indicated, by the Bush B–3 system, that essentially all of the 7α-methyl-19-nortestosterone (I) had been reacted and that two compounds showing the characteristics of aromatic A ring steroids were present. The less polar compound had the mobility of 7α-methylestrone (I) and the more polar that of 7α-methylestradiol (II). The methylene chloride extracts were evaporated to dryness and the residues obtained used for isolating the fermentation products. The crude residue was dissolved in methylene chloride and chromatographed through a 150 g. Florisil (synthetic magnesium silicated) column packed wet with Skellysolve B-hexanes) and eluted in 400 ml. fractions by gradient elution between 5 l. of 4 percent acetone-Skellysolve B and 5 l. of 12 percent acetone-Skellysolve B. Fractions 4 through 7 gave well-formed crystals. These fractions were combined and recrystallized from methanol with Darco (activated charcoal) treatment to give 0.45 g. of 7α-methylestrone (I), melting at 237° to 238° C. $\lambda_{max}^{alc.}$ 280 m$\mu$; $\epsilon$=2,100.

Anal. Calcd. for $C_{19}H_{24}O_2$: C, 80.21; H, 8.51
Found: C, 80.10; H, 8.34

7α-methylestradiol (II) can be isolated from the more polar fractions.

EXAMPLE 2

7α-methylestrone (I)

A sterile medium was prepared containing 10 l. of tap water, 20 g. of cornsteep liquors and 100 g. of commercial dextrose and adjusted to pH 5 with sodium hydroxide. This was inoculated with 500 ml. of vegetative growth of *Septomyxa affinis* (ATCC 6737) grown on the same medium. The culture was stirred and aerated at a rate of 0.1 l./minute. At the end of about 24 hours the pH was 7. To the fermentor, 2 g. of 7α-methyl-19-nortestosterone and 0.1 g. of 3-ketobisnor-4-cholen-22al dissolved in 20 ml. of N,N-dimethylformamide was added. Aeration was continued for about 48 hours, the pH adjusted to 3 and the beer extracted four times with methylene chloride. Paper chromatography indicated the presence of 7α-methylestrone (I) in the extract. The product (I) can be isolated in accordance with the procedure described in example 1 to give essentially pure 7α-methylestrone (I).

Following the procedure of examples 1 and 2 but substituting 7α-methyl-19-nor-4-androstene-3,17-dione for 7α-methyl-19-nortestosterone also yields 7α-methylestrone (I).

EXAMPLE 3

7α-methylestrone (I)

A mixture of 100 mg. of 7α-methyl-19-nor-4-androstene-3,17-dione, 40 mg. of 5 percent palladium on charcoal catalyst in 100 ml. of p-cymene (purified by passing through a column of alumina) was refluxed for about 1.5 hours. The catalyst was removed by filtration and the filtrate concentrated in a rotary evaporator. The residue was crystallized from ether to give 25 mg. of 7α-methylestrone (I), melting at 218° to 230° C., $\lambda_{max}^{alc.}$ 279 m$\mu$, $\epsilon$=2,150. Infrared spectral analysis indicates it is the same compound as prepared in examples 1 and 2. The product can be further purified by recrystallization or chromatography to give essentially pure 7α-methylestrone (II).

EXAMPLE 4

7α-methylestrone (I)

To a solution of 100 mg. of 7α-methyl-19-nor-4-androstene-3,17-dione, 100 mg. of 2,3-dichloro-5,6-dicyanobenzoquinone (DDQ) and 0.5 ml. of acetic acid in 3 ml. of dioxane, 2 drops of 2.8 N hydrochloric acid solution in dioxane was added. After standing for about 16 hours, methylene chloride was added to the mixture and the solids filtered off. The filtrate was dried and the solvent removed. The residue, weighing about 30 mg., was triturated with methanol to give about 1 mg. of 7α-methylestrone (I) with $\lambda_{max}^{alc.}$ 280 m$\mu$, $\epsilon$=2,350. Infrared analysis indicated that the thus produced compound is the same as those prepared in examples 1, 2 and 3.

Following the procedure of example 4, but substituting selenium dioxide or tetrachloro-p-benzoquinone (chloranil) for DDQ, also yields 7α-methylestrone (I).

EXAMPLE 5

7α-methylestrone (I)

A pyrolysis tube (18 inch × 1 inch) equipped with thermocouples about 3 inches from each end and packed with glass tubing cut in about 1/4-inch lengths was heated to about 550° C. and heavy mineral oil passed through at a rate of 5 ml./minute until constant temperature of 500° to 510° C. at the top and 540° to 560° C. at the bottom was obtained. A mixture of 10.4 g. of 7α-methyl-1,4-androstadiene-3,17-dione and 500 ml. of heavy mineral oil mixed in a Waring blender was added at a rate of 5 ml./minute, maintaining the above temperatures. The effluent was refrigerated for several hours and the crystalline precipitate collected, washed thoroughly with Skellysolve B and dried to give 6.7 g. of crude 7α-methylestrone (I). It was dissolved hot methylene chloride, cooled and poured on a 350 g. Florisil column packed wet with Skellysolve B and eluted with 400 ml. fractions by gradient elution between 5 l. of 4 percent acetone-Skellysolve B and 5 l. of 12 percent acetone-Skellysolve B. The desired product was contained in fractions 10 through 21. The residues obtained from these fractions were combined and recrystallized from methanol to give 3.75 g. of 7α-methylestrone (I), having a melting point of 230° to 235° C.; $[\alpha]_D +140°$ (chloroform); $\lambda_{max}^{alc.}$ 279 m$\mu$; $\epsilon$=2,250. Nuclear magnetic resonance (NMR) spectra confirm the proposed structure and infrared spectral analysis shows it is the same as the product obtained in examples 1, 2, 3 and 4.

EXAMPLE 6

7α-methylestrone (I)

Treating 7α-methyl-1,4-androstadiene-3,17-dione in accordance with the procedures described in J. Amer. Chem. Soc. 86, 742, namely with lithium and diphenyl in the presence of diphenyl methane and employing tetrahydrofuran as solvent, yields 7α-methylestrone (I).

EXAMPLE 7

7α-methylestrone 3-cyclopentyl ether (I)

A mixture of 1 g. of 7α-methylestrone (I) and 1 g. of cyclopentyl bromide is added slowly to a solution of sodium ethylate (prepared from 0.1 g. of sodium and 8 ml. of absolute ethanol). The reaction mixture is heated to reflux for about 4 hours, the ethanol removed by distillation and the residue treated with a small amount of water. A precipitate of 7α-methylestrone 3-cyclopentyl ether (I) is obtained which is crystallized from a mixture of methylene chloride and methanol.

EXAMPLE 8

7α-methylestrone 3-methyl ether (I)

To 4 g. of 7α-methylestrone (I) in a solution containing 6.4 g. of potassium hydroxide, 14 ml. of water and 21 ml. of methanol, 14 ml. of dimethyl sulfate was added dropwise with stirring and cooling sufficient to keep the reaction temperature at 25° to 35° C. At the same time a solution of 14 g. of potassium hydroxide in 28 ml. of water and 42 ml. of methanol was added dropwise at a rate that kept the pH of the reaction mixture about 10. The addition of the dimethylsulfate required about 30 minutes and the addition of the potassium hydroxide solution about 1 hour. The reaction mixture was stirred an additional 1.5 hours. Water was added and crystalline product collected on a filter, washed with water and dried to yield 3.8 g. of product (I) melting at 155° to 163° C. It was recrystallized from methanol to give an analytical sample of 7α-methylestrone 3-methyl ether (I) melting point 163° to 165°; $\lambda_{max}^{alc.}$ 276 m$\mu$; $\epsilon$=2,100; $\lambda_{max}^{alc.}$ 286 m$\mu$; $\epsilon$=2,050.

Anal. Calcd. for $C_{20}H_{28}O_2$: C, 79.95; H, 9.39.
Found: C, 80.28; H, 9.48.

Following the procedure of example 8 but substituting for dimethylsulfate the following:
1. diethylsulfate,
2. dipropylsulfate,
3. diisopropylsulfate,
4. dibutylsulfate,
5. di-s-butylsulfate,
6. dipentylsulfate,
7. dihexylsulfate,
8. diheptylsulfate and
9. dioctylsulfate, yields, respectively,
1. 7α-methylestrone 3-ethyl ether (I),
2. 7α-methylestrone 3-propyl ether (I),
3. 7α-methylestrone 3-isopropyl ether (I),
4. 7α-methylestrone 3-butyl ether (I),
5. 7α-methylestrone 3-s-butyl ether (I),
6. 7α-methylestrone 3-pentyl ether (I),
7. 7α-methylestrone 3-hexyl ether (I),
8. 7α-methylestrone 3-heptyl ether (I) and
9. 7α-methylestrone 3-octyl ether (I).

EXAMPLE 9

7α-methylestrone 3-tetrahydropyranyl ether (I)

To a solution of 4 g. of 7α-methylestrone (I) in 40 ml. of tetrahydrofuran (purified by percolation through a column of alumina) and 8 ml. of freshly distilled dihydropyran, 0.4 ml. of phosphorus oxychloride was added dropwise with stirring under nitrogen and cooling in an ice bath. After the addition was completed the ice bath was removed and after an additional 15 minutes the reaction mixture was poured into a mixture of saturated solution of sodium bicarbonate, ether and ice. The ether layer was separated, washed with dilute sodium bicarbonate solution, water, dried over sodium sulfate and filtered. The filtrate was evaporated to dryness to give 5.1 g. of 7α-methylestrone 3-tetrahydropyranyl ether (I).

Following the procedure of example 9 but substituting for dihydropyran the following:
1. dihydrofuran,
2. 5-hydroxymethyldihydropyran,
3. 5-carboxydihydropyran, etc., yields, respectively,
1. 7α-methylestrone 3-tetrahydrofuranyl ether (I),
2. 7α-methylestrone 3-(5-hydroxymethyl) tetrahydropyranyl ether (I),
3. 7α-methylestrone 3-(5-carboxy) tetrahydropyranyl ether (I), etc.

EXAMPLE 10

7α-methylestrone 3-acetate (I)

To 1 g. of 7α-methylestrone (I), 2 ml. of pyridine and 1 ml. of acetic anhydride is added. The reaction mixture is kept at room temperature for about 3 hours; water is then added to precipitate the product (I) and destroy the excess acetic anhydride. Recrystallization from acetone and Skellysolve B yields 7α-methylestrone 3-acetate (I).

Following the procedure of example 10 but substituting for acetic anhydride (and allowing additional time for the slower reacting anhydrides) the following:
1. benzoic acid anhydride,
2. propionic anhydride,
3. butyryl chloride,
4. i-valeryl chloride,
5. decanoyl chloride,
6. hexanoic anhydride,
7. sec. octanoic anhydride
8. capric anhydride,
9. undecyl anhydride,
10. dodecanoyl chloride, etc., yields, respectively,
1. 7α-methylestrone 3-benzoate (I),
2. 7α-methylestrone 3-propionate (I),
3. 7α-methylestrone 3-butyrate (I),
4. 7α-methylestrone 3-i-valerate (I), 5. 7α-methylestrone 3-decanoate (I),
6. 7α-methylestrone 3-hexanoate (I),
7. 7α-methylestrone 3-sec. octanoate (I),
8. 7α-methylestrone 3-caproate (I),
9. 7α-methylestrone 3-undecanoate (I),
10. 7α-methylestrone 3-dodecanoate (I), etc.

EXAMPLE 11

7α-methylestrone 3-trimethylsilyl ether (I)

To a suspension of 4 g. of 7α-methylestrone (I) in 10 ml. of dry acetone, 6.5 ml. of hexamethyldisilazane was added. The mixture was stirred for about 4 days and then evaporated to dryness. The residue was dissolved in a mixture of methylene chloride and Skellysolve B and chromatographed over a 250 g. column of Florisil. Gradient elution between 5 l. of Skellysolve B and 5 l. of 10 percent acetone-90 percent Skellysolve B yielded 2.5 g. of 7α-methylestrone 3-trimethylsilyl ether (II) having a melting point of 103° to 107° C.

Following the procedure of example 11 but substituting other disilizanes for hexamethyldisilizane, such as symmetrical diphenyltetramethyldisilazane, hexaamyldisilazane, etc., yields, respectively, 7α-methylestrone 3-phenyldimethylsilyl ether (I), 7α-methylestrone 3-triamylsilyl ether (I), etc.

The reactions of example 11 and the paragraph thereafter are preferably carried out with the addition of a few drops to 2 ml. of trimethylsilyl chloride.

In place of acetone in example 11, other inert dry solvents, such as tetrahydrofuran, dioxane, methylene chloride and the like, can be utilized.

EXAMPLE 12

7α-methylestradiol (II)

To a solution of 100 mg. of 7α-methylestrone (I) in 5 ml. of methanol, one drop of water and 40 mg. of sodium borohydride was added. After about 15 minutes a small additional amount of sodium borohydride was added. After several more minutes excess sodium borohydride was destroyed with a few drops of acetic acid. Water was added and the solution neutralized with 2 N hydrochloric acid. The crystalline residue was collected, washed with water and recrystallized from aqueous methanol. After several days of drying at 75° C. the compound, 7α-methylestradiol (II), melted at 157° to 161° C.; $\lambda_{max}^{alc}$. 281 $\mu u$; $\epsilon = 2,100$. Its infrared absorption spectrum supports the structure proposed for it.

Anal. Calcd. for $C_{17}H_{26}O_2$: C, 79.67; H, 9.15.
Found: C, 79.37; H, 9.21.

Following the procedure of Example 12 but substituting for 7α-methylestrone (I) starting materials such as:
1. 7α-methylestrone 3-cyclopentyl ether (I),
2. 7α-methylestrone 3-methyl ether (I),
3. 7α-methylestrone 3-acetate (I),
4. 7α-methylestrone 3-tetrahydropyranyl ether (I)
5. 7α-methylestrone 3-trimethylsilyl ether (I), etc. yields, respectively,
1. 7α-methylestradiol 3-cyclopentyl ether (II),
2. 7α-methylestradiol 3-methyl ether (II),
3. 7α-methylestradiol 3-acetate (II),
4. 7α-methylestradiol 3-tetrahydropyranyl ether (II)
5. 7α-methylestradiol 3-trimethylsilyl ether (II), , etc.

EXAMPLE 13

7α-methylestradiol (II)

A mixture of 100 mg. of 7α-methyl-19-nortestosterone, 40 mg. of catalyst (5 percent palladium on activated charcoal) in 100 ml. of p-cymene (purified by passing through a column of alumina) was refluxed for about 1.5 hours. The catalyst was removed by filtration and the filtrate concentrated to dryness to give 7α-methylestradiol (II). The product may be further purified by chromatography and recrystallization.

EXAMPLE 14

7α-methylestradiol 17-acetate (II)

Following the procedure of example 13, but employing 7α-methyl-19-nortestosterone 17-acetate as starting material, yields 7α-methylestradiol 17-acetate (II).

Following the procedure of example 14, but substituting for 7α-methyl-19-nortestosterone 17-acetate other 7α-methyl-19-nortestosterone 17-acylates, such as the 17-propionate, 17-butyrate, 17-i-valerate, 17-sec. octanoate, 17-dodecanoate, etc., yields the corresponding 7α-methylestradiol 17-acylate (II).

EXAMPLE 15

7α-methylestradiol 3-methyl ether (II)

Following the procedure of example 8, but substituting 7α-methylestradiol (II) for 7α-methylestrone (I) as starting material, is production of the 3-methyl ether of 7αmethylestradiol (II).

Similarly, following the procedure of example 8, but substituting for 7α-methylestrone (I) as starting material 7α-methylestradiol and substituting for dimethylsulfate the following:
1. diethylsulfate,
2. dipropylsulfate,
3. diisopropylsulfate,
4. dibutylsulfate,
5. di-s-butylsulfate,
6. dipentylsulfate,
7. dihexylsulfate,
8. diheptylsulfate and
9. dioctylsulfate, yields, respectively,
1. 7α-methylestradiol 3-ethyl ether (II),
2. 7α-methylestradiol 3-propyl ether (II),
3. 7α-methylestradiol 3-isopropyl ether (II),
4. 7α-methylestradiol 3-butyl ether (II),
5. 7α-methylestradiol 3s-butyl ether (II),
6. 7α-methylestradiol 3-pentyl ether (II),
7. 7α0 -methylestradiol 3-hexyl ether (II),
8. 7α-methylestradiol 3-heptyl ether (II) and
9. 7α-methylestradiol 3-octyl ether (II).

EXAMPLE 16

7α-methylestradiol 17-acetate 3-trimethylsilyl ether (II)

To a suspension of 4 g. of 7α-methylestradiol 17-acetate (II) in 10 ml. of dry acetone, 6.5 ml. of hexamethyldisilazane is added. The mixture is stirred for about 4 days and then evaporated to dryness. The residue is dissolved in a mixture of methylene chloride and Skellysolve B and chromatographed over a 200 g. column of Florisil. The product is eluted by gradient elution between Skellysolve B and 10 percent acetone in Skellysolve B to give 7α-methylestradiol 17-acetate, 3-trimethylsilyl ether (II).

Following the procedure of example 16 but substituting other disilazanes for hexamethyldisilazine, such as symmetrical diphenyltetramethyldisilazane, hexaamyldisilazane, etc., yields, respectively, 7α-methylestradiol 17-acetate, 3-phenyldimethylsilyl ether (II), 7α-methylestradiol 17-acetate, 3-triamylsilyl ether (II), etc.

The reactions of example 16 and the paragraph thereafter are preferably carried out with the addition of a few drops to 2 ml. of trimethylsilyl chloride.

In place of acetone in example 16, other inert dry solvents, such as tetrahydrofuran, dioxane, methylene chloride and the like, can be utilized.

Substituting other 7α-methylestradiol 17-acylates (II) for 7α-methylestradiol 17-acetate (II) and the procedure of example 16 is productive of other 7α-methylestradiol 17-acylate, 3-trimethylsilyl ethers (II).

Substituting 7α-methylestradiol (II) for 7α0 -methylestradiol 17-acetate (II) in the procedure of example 16 is productive of a mixture of 7α-methylestradiol 3,17-bissilyl ethers (II) (major component) and 7α-methylestradiol 3-silyl ethers (II) (minor component). The mixture can be separated into its components by chromatography over basic alumina to afford an essentially pure 7α-methylestradiol bissilyl ether (II) which exhibits no hydroxyl absorption in the infrared spectrum and a 7α-methylestradiol 3-silyl ether (II) which exhibits hydroxyl absorption in its infrared spectrum.

EXAMPLE 17

7α-methylestradiol 3,17-diacetate (II)

Following the procedure of example 10, but substituting 7α-methylestradiol (II) for 7α-methylestrone (I) as starting material yields 7α-methylestradiol 3,17-diacetate (II). Additionally, substituting the acid anhydrides named following example 10 for acetic anhydride yields the corresponding 3,17-diacylates, respectively, 1. 7α-methylestradiol 3,17dibenzoate (II),
2. 7α-methylestradiol 3,17-dipropionate (II),
3. 7α-methylestradiol 3,17-dibutyrate (II),
4. 7α-methylestradiol 3,17-divalerate (II),
5. 7α-methylestradiol 3,17-didecanoate (II),
6. 7α-methylestradiol 3,17-dihexanoate (II),
7. 7α-methylestradiol 3,17-disecondaryoctanoate (II),
8. 7α-methylestradiol 3,17-dicaproate (II),
9. 760-methylestradiol 3,17-diundecanoate (II),
10. 7α-methylestradiol 3,17-didodecanoate (II), etc.

Substituting 7α-methylestradiol 3-acylates (II) for 7α-methylestradiol (II) in the procedure of example 17 is productive of 7α-methylestradiol 3,17-diacylates (II) in which the two acylate groups can be the same or different.

Substituting 7α-methylestradiol 3-methyl ether (II) 7α-methylestradiol 3-cyclopentyl ether (II) other 7α-methylestradiol 3-ethers (II), 7α-methylestradiol 3-tetrahydropyranyl ether (II), 7α-methylestradiol 3-tetrahydrofuranyl ether (II), 7α-methylestradiol 3-trimethylsilyl ether (II), other 7α-methylestradiol 3-silyl ethers, and the like for 7α-methylestradiol (II) in the procedure of example 17 affords the corresponding 17-monoacylate (II), e.g., 7α-methylestradiol 3-methyl ether 17-propionate (II), 7αmethylestradiol 3-cyclopentyl ether 17-acetate (II), 7α-methylestradiol 3-tetrahydropyranyl ether 17-acetate (II), 7α-methylestradiol 3-tetrahydrofuranyl ether 17-acetate (II), 7α-methylestradiol 3-trimethylsilyl ether 17-decanoate (II) and the like.

EXAMPLE 18

7α-methylestradiol 17-trimethylsilyl ether (II)

In a solution of 1 g. of 7α-methylestradiol 3-acetate 17-trimethylsilyl ether (II) in 30 ml. of isopropyl alcohol, 10 ml. of water containing 500 mg. of sodium bicarbonate is added. The mixture is allowed to stand for one-half hour and is then evaporated at room temperature under vacuum. Methylene chloride and water are added and the organic phase separated and washed several times with water. The solvent is evaporated to afford 7α-methylestradiol 17-trimethylsilyl ether (II). The product is purified, if desired, by chromatography over neutral alumina to give essentially pure 7α-methylestradiol 17-trimethylsily ether (II).

Substituting other 17-silyl ethers of 7α-methylestradiol 3-acetate (II) (e.g., the 17-triamylsilyl ether) in the procedure of example 18 is productive of the corresponding 7α-methylestradiol 17-silyl ether (II).

As indicated above, the compounds of this invention are useful for their estrogenic activity in mammals. Dosage depends on the particular compound involved, route of administration, severity of the condition being treated and the individual's response thereto. In general, a dose of between about 0.01 mg. to about 5 mgs. of each of the compounds exemplified in examples 12 through 18 and embraced within formula II is given orally once a day, or subcutaneously or intramusculary in a dose of 0.05 to 10 mg. weekly to monthly in the treatment of conditions incident to the foregoing activity when incorporated in conventional pharmaceutical compositions.

The following examples illustrate the incorporation of the active ingredients of this invention in pharmaceutical formulation for use as estrogenics.

EXAMPLE 19

Compressed tablets

A lot of 10,000 compressed tablets, each containing 0.05 mg. of 7α-methylestradiol or 7α-methylestradiol 3-methyl ether is prepared from the following ingredients:

| | |
|---|---|
| 7α-methylestradiol or 7α-methylestradiol 3-methyl ether | 0.5 g. |
| Dicalcium phosphate | 2500 g. |
| Methylcellulose, USP (15 cps.) | 65 g. |
| Talc, bolted | 450 g. |
| Calcium stearate, fine powder | 35 g. |

The 7α-methylestradiol or 7α-methylestradiol 3-methyl ether and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and and stearate and compressed into tablets.

EXAMPLE 20

Hard gelatin capsules

A lot of 1000 hard gelatin capsules, each containing 0.5 mg. of 7α-methylestradiol or 7α-methylestradiol 3-methyl ether is prepared from the following ingredients:

| | |
|---|---|
| 7α-methylestradiol or 7α-methylestradiol 3-methyl ether | 0.5 g. |
| Lactose | 150 g. |
| Calcium stearate | 2 g. |
| Talc | 3 g. |

The lactose, talc and stearate are mixed well and incorporated into the mixture. The whole is mixed well and filled into two-piece hard gelatin capsules.

EXAMPLE 21

Soft gelatin capsules

A batch of 1000 soft gelatin capsules, each containing 0.5 mg. of 7α-methylestradiol or 7α-methylestradiol 3-methyl ether and corn oil is prepared from the following materials:

| | |
|---|---|
| 7α-methylestradiol or 7α-methylestradiol 3-methyl ether | 0.5 g. |
| Corn oil | q.s. |

A uniform dispersion of the active ingredient in the corn oil is prepared and the dispersion filled into soft gelatin capsules by conventional means.

EXAMPLE 22

Aqueous oral suspension

An aqueous oral suspension containing in each 5 ml. 0.5 mg. of 7α-methylestradiol or 7α-methylestradiol 3-methyl ether is prepared from the following materials:

| | |
|---|---|
| 7α-methylestradiol or 7α-methylestradiol 3-methyl ether micronized | 1.0 g. |
| Methylparaben, USP | 7.5 g. |
| Propylparaben, USP | 2.5 g. |
| Saccharin sodium | 12.5 g. |
| Cyclamate sodium | 2.5 g. |
| Glycerin 3000 ml. | |
| Tragacanth powder | 100 g. |
| Orange oil flavor | 10 g. |
| F.D. and C. orange dye | 7.5 g. |
| Deionized water, q.s. to | 10,000 ml. |

EXAMPLE 23

Aqueous suspension for injection

A suspending vehicle is prepared from the following materials:

| | |
|---|---|
| Polyethylene glycol 4000 | 30 g. |
| Potassium chloride | 11.2 g. |
| Polysorbate 80 | 2 g. |
| Methylparaben | 1.8 g. |
| Propylparaben | 0.2 g. |
| Water for injection q.s. | 1000 ml. |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 0.5 g. of 7α-methylestradiol or 7α-methylestradiol 3-methyl ether which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 0.5 mg. 7α-methylestradiol or 7α-methylestradiol 3-methyl ether.

As indicated above, the compounds of this invention, in addition to their use as estrogenics, when combined with progestins, e.g., 6α-methyl-17α-hydroxyprogesterone 17-acetate (Provera), 7α-methyl-17α-ethynyl-19-nortestosterone, 17α-hydroxy-6-methyl-16-methylene-4,6-pregnadiene-3,20-dione 17-acetate (Melengestrol acetate), etc., are useful for the prevention of ovulation in mammals. Administration to mammals depends on the particular progestin and estrogen involved and the individual's response thereto. In general, a dose of between about 0.01 mg. to about 5 mgs. of each of the estrogens exemplified in examples 12 through 18 and embraced within formula II plus between about 1 mg. to about 100 mgs. of a progestin is given at such time(s) in the mammalian ovulatory cycle as is suitable for the prevention of ovulation.

The following examples illustrate the incorporation of the active ingredients of this invention with progestins in pharmaceutical formulation for use as anovulatory agents.

EXAMPLE 24

Oral tablets 50,000 tablets for oral administration are prepared from the following types and amounts of materials. Each tablet contains 3.0 mgs. of 6α-methyl-17α-hydroxyprogesterone 17-acetate and 0.03 mg. of 7α-methylestradiol or 7α-methylestradiol 3-methyl ether

| | |
|---|---|
| 6α-methyl-17α-hydroxyprogesterone 17-acetate | 5 oz. |
| 7α-methylestradiol or 7α-methylestradiol 3-methyl ether | 23 grains |
| Lactose | 3 lbs. |

The finely powdered active ingredients and lactose are mixed well and granulated with syrup-starch paste. Starch and calcium stearate are used as lubricants in the compressing step.

EXAMPLE 25

Oral tablets 10,000 tablets for oral administration are prepared from the following types and amounts of ingredients. Each tablet contains 10 mgs. of 6α-methyl-17α-hydroxyprogesterone 17-acetate and 0.05 mg. of 7α-methylestradiol or 7α-methylestradiol 3-methyl ether.

| | |
|---|---|
| 6α-methyl-17α-hydroxyprogesterone 17-acetate | 100 g. |
| 7α-methylestradiol or 7α-methylestradiol 3-methyl ether | 0.5 g. |
| Lactose | 2600 g. |

The finely powdered active ingredients and lactose are mixed well and granulated with syrup-starch paste. Starch talc, and calcium stearate are used as lubricants in the compressing step.

EXAMPLE 26

Oral aqueous suspension

An aqueous suspension for oral administration, containing in each teaspoonful (approximately 5 mls.) 5 mgs. of 6α-methyl-17α-hydroxyprogesterone 17-acetate and 0.2 mg. of 7α-methyl-estradiol or 7α-methylestradiol 3-methyl ether is prepared from the following types and amounts of ingredients:

| | |
|---|---|
| 6α-methyl-17α-hydroxyprogesterone 17-acetate | 1 g. |
| 7α-methylestradiol or 7α-methylestradiol 3-methyl ether | 40 mg. |
| Preservative | 2 g. |
| Flavor, q.s. | |
| Purified water U.S.P., u.s. ad 1000 mls. | |

The preservative and flavor are dissolved in the water. The micronized active ingredients are added and the whole is homogenized.

EXAMPLE 27

Oral gelatin capsules 1000 gelatin capsules for oral administration, each containing 10 mgs. of 6α-methyl-17α-hydroxyprogesterone 17-acetate and 0.05 mg. of 7α-methylestradiol or 7α-methylestradiol 3-methyl ether are prepared from the following types and amounts of materials:

| | |
|---|---|
| 6α-methyl-17α-hydroxyprogesterone 17-acetate | 10 g. |
| 7α-methylestradiol or 7α-methylestradiol 3-methyl ether | 50 mgs. |
| Ingestible oil, q.s. | |

The micronized active ingredients and the oil are mixed and the mix is encapsulated by the usual techniques into gelatin capsules.

EXAMPLE 28

Oral tablets

Following the procedure of example 24, 5000 tablets are prepared from the following types and amounts of ingredients. Each tablet:

| | |
|---|---|
| 5 mgs. 6α-methyl-17α-hydroxyprogesterone 17-acetate | 25 g. |
| 0.01 mg. 7α-methylestradiol or 7α-methylestradiol 3-methyl ether | 50 mgs. |
| 150 mgs. lactose | 750 g. |
| 3 mgs. acacia | 15 g. |
| 65 mgs. starch, bolted | 325 g. |
| 3 mgs. calcium stearate | 15 g. |

Tablets equally suited for the inhibition of ovulation are prepared by using 250 and 1000 mgs., respectively, of the 7α-methylestradiol or 7α-methylestradiol 3-methyl ether in place of the 50 mgs. in the above formulation.

While the procedure described above in examples 24 through 28 recite the use of the progestin 6α-methyl-17α-hydroxyprogesterone 17-acetate, other progestational compounds can be substituted therefor the provide similarly effective anovulatory pharmaceutical formulations; e.g., 7α-methyl-17α-ethynyl-19-nortestosterone, 17α-hydroxy-6-methyl-16-methylene-4,6-pregnadiene-3,20-dione 17-acetate, 17-hydroxy-19-nor-17α-pregn-5(10)-en-20-yn-3-one,19nor-17α-pregn-4-en-20-yne-3β, 17-diol 3,17-diacetate, 17-hydroxy-19-nor-17α-pregn-4-en-20-yn-3-one 17-acetate, 6α,21-dimethyl-17β-hydroxy-4-pregnen-20-yn-3-one, 6-chloro-17α-hydroxy-4,6-pregnadiene-3,20-dione 17acetate, etc., can be employed instead of 6α-methyl-17α-hydroxyprogesterone 17-acetate.

We claim:

1. 7α-methylestradiol 3,17-bistrimethylsilyl ether having the formula

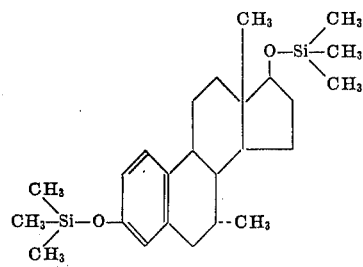

2. An oral pharmaceutical composition comprising:
a. about 0.01 to about 5 mg. of a compound of the formula

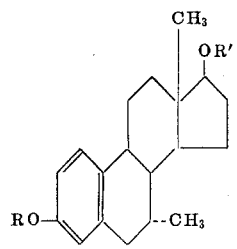

wherein R is selected from the group consisting of hydrogen and methyl and R' is and
  b. about 1 to about 100 mg. of a progestin, dispersed in an oral pharmaceutical carrier.

3. A composition in accordance with claim 2 wherein the progestin is 7α-methyl-17α-ethynyl-19-nortestosterone.

4. A method of preventing ovulation in ovulating mammals comprising: orally administering to ovulating mammals an effective amount of
  a. a compound of the formula

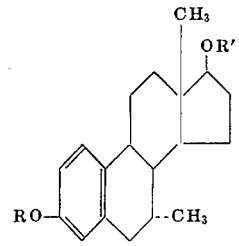

wherein R is selected from the group consisting of hydrogen and methyl and R' is hydrogen, and
  b. a progestin.

5. A method of preventing ovulation in ovulating mammals in accordance with claim 4 wherein the progestin is 7α-methyl-17α-ethynyl-19-nortestosterone.

* * * * *